(12) United States Patent
Betz et al.

(10) Patent No.: US 7,519,599 B2
(45) Date of Patent: Apr. 14, 2009

(54) SYSTEM AND METHOD FOR SCALABLE DISTRIBUTION OF SEMANTIC WEB UPDATES

(75) Inventors: Joseph P. Betz, Arlington, MA (US); Matthew N. Roy, Brookline, MA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/423,460

(22) Filed: Jun. 12, 2006

(65) Prior Publication Data

US 2008/0005278 A1   Jan. 3, 2008

(51) Int. Cl.
*G06F 7/00* (2006.01)
*G06F 17/30* (2006.01)
*G06F 15/16* (2006.01)

(52) U.S. Cl. .................. 707/9; 707/104.1; 707/1; 707/10; 709/204; 705/50

(58) Field of Classification Search .............. 707/104.1, 707/10, 9; 705/50; 709/204
See application file for complete search history.

(56) References Cited

U.S. PATENT DOCUMENTS 5,911,143 A * 6/1999 Deinhart et al. ......... 707/103 R
2002/0073080 A1 * 6/2002 Lipkin ........................... 707/3
2002/0161674 A1 * 10/2002 Scheer ......................... 705/28
2003/0217061 A1 * 11/2003 Agassi et al. ................. 707/10
2003/0229529 A1 * 12/2003 Mui et al. ...................... 705/8
2007/0060109 A1 * 3/2007 Ramer et al. ............. 455/414.1
2007/0078857 A1 * 4/2007 Punaganti et al. ............. 707/10
2007/0156878 A1 * 7/2007 Martin et al. ................ 709/223
2007/0233957 A1 * 10/2007 Lev-Ran et al. ............. 711/118
2008/0086402 A1 * 4/2008 Patel et al. .................... 705/35

* cited by examiner

*Primary Examiner*—Tony Mahmoudi
*Assistant Examiner*—Dennis Truong
(74) *Attorney, Agent, or Firm*—Scully, Scott, Murphy & Presser, P.C.; John E. Campbell, Esq.

(57) ABSTRACT

Disclosed are a method and system for scalable distribution of semantic web updates. A first embodiment of the invention leverages publish/subscribe technology to distribute those updates such that clients receive only the information they require. A second embodiment of the invention uses an access control feature to limit the statements clients are allowed to read. Optionally, in this second embodiment, the same publish/subscribe messaging infrastructure may be used both to distribute updated semantic web data, and also to distribute relevant changes to the access control information. The invention is particularly well suited for use with the Resource Description Framework (RDF) language.

4 Claims, 10 Drawing Sheets

FIG.1

```
           statement: "http://test.ibm.com/statements#1"
           method: "add"
           subject: "http://test.ibm.com/serverManual.pdf"
    202    predicate: "http://test.ibm.com/predicates#rating"
           object: "fair"
           objectType: "http://www.w3.org/2001/XMLSchema#string"
           timestamp: "2004-07-19T17:27:27.812Z"

statement: "http://test.ibm.com/statements#1"
           method: "change"
           subject: "http://test.ibm.com/serverManual.pdf"
           predicate: "http://test.ibm.com/predicates#rating"
    204    object: "excellent"
           objectType: "http://www.w3.org/2001/XMLSchema#string"
           previousObject: "Fair"
           previousObjectType: "http://www.w3.org/2001/XMLSchema#string"
           timestamp: "2004-07-19T17:27:27.812Z"

statement: "http://test.ibm.com/statements#1"
           method: "remove"
           subject: "http://test.ibm.com/serverManual.pdf"
    206    predicate: "http://test.ibm.com/predicates#rating"
           object: "excellent"
           objectType: "http://www.w3.org/2001/XMLSchema#string"
           timestamp: "2004-07-19T17:27:27.812Z"
```

SAMPLE STATEMENT UPDATE MESSAGE:

802 →
```
statement: "http://test.ibm.com/statements#1"
method: "add"
subject: "http://test.ibm.com/serverManual.pdf"
predicate: "http://test.ibm.com/predicates#rating"
object: "excellent"
objectType: "http://www.w3.org/2001/XMLSchema#string"
timestamp: "2004-07-19T17:27:27.812Z"
transactionId: "A98234EF23B2323CD1"
acl: "http://test.ibm.com/acls#238843"
```

SAMPLE TRANSACTION COMPLETE MESSAGE:

804 →
```
transactionId: "A98234EF23B2323CD1"
status: "commit"
```

806 →
```
transactionId: "A98234EF23B2323CD1"
status: "abort"
```

SAMPLE STATEMENT UPDATE MESSAGE:

statement: "http://test.ibm.com/statements#1"
method: "add"
1202 — subject: "http://test.ibm.com/serverManual.pdf"
predicate: "http://test.ibm.com/predicates#rating"
object: "excellent"
objectType: "http://www.w3.org/2001/XMLSchema#string"
timestamp: "2004-07-19T17:27:27.812Z"
transactionId: "A98234EF23B2323CD1"
acl: "http://test.ibm.com/acls#238843"

SAMPLE TRANSACTION COMPLETE MESSAGE:

1204 — transactionId: "A98234EF23B2323CD1"
status: "commit"

1206 — transactionId: "A98234EF23B2323CD1"
status: "abort"

SAMPLE ACL AND GROUP UPDATE MESSAGES. UPDATE MANAGER WILL SUBSCRIBE TO MESSAGES THAT CONTAIN EITHER THE USER NAME FOR A CONNECTION OR ONE OF THAT USER'S GROUPS.

acl: "http://test.ibm.com/acls#238843"
1210 — allowUser: "jsmith@ibm.com"
disallowUser: "jdoe@ibm.com,alincoln@ibm.com"
allowGroup: "managers"

1212 — acl: "http://test.ibm.com/acls#238843"
allowGroup: "allUsers"
disallowGroup: "contractors"

1214 — group: "contractors"
addUser: "jsmith@ibm.com"
removeUser: "jdoe@us.ibm.com"

FIG.12

SYSTEM AND METHOD FOR SCALABLE DISTRIBUTION OF SEMANTIC WEB UPDATES

BACKGROUND OF THE INVENTION

1. Field of the Invention

This invention generally relates to semantic web technology, and more specifically, to methods and systems for scalable distribution of semantic web updates. Even more specifically, the invention relates to such methods and systems that are particularly well suited for use with the Resource Description Framework (RDF) language.

2. Background Art

RDF is a language used to represent information, particularly meta data about resources available in the World Wide Web. For example, RDF may be used to represent copyright or licensing information about a document on the Web, or the author and title of a particular Web page. RDF can also be employed for representing data or meta data about items or matters that can be identified on the World Wide Web even though these items cannot be directly retrieved from the Web. Examples of these latter items may include data about a user's Web preferences, and information, such as the price and availability, of items for sale at on-line shopping facilities. Specifications for RDF are established by the World Wide Web Consortium. The RDF specification also describes how to serialize RDF data for use in web services, etc. (e.g. RDF/XML).

RDF uses identifiers, referred to as Uniform Resource Identifiers, or URIs, and is based on a specific terminology. An RDF statement includes a subject, a predicate and an object. The subject identifies the thing, such as person or Web page, that the statement is about. The predicate identifies the property or characteristic, such as title or owner, of the subject of the RDF statement, and the object identifies a value of that property or characteristic. For example, if the RDF statement is about pet owners, the subject might be "owner," the predicate could be "name," and the object could be "Joe." This format, among other advantages, allows RDF to represent statements as a graph of nodes and arcs. In the graph, the subjects and objects may be represented by, for example, ovals, circles or squares, or some combination thereof while the predicates of the RDF statements may be represented by arcs or arrows connecting the subject of each statement with the object of the statement.

An important feature of RDF is that it provides a common framework for expressing information. This allows this information to be exchanged among applications without losing any meaning of the information. Because of this common framework application developers can utilize the availability of common tools and parsers to process RDF information.

While the RDF specification describes a data model, and there exists several query languages, there is no standard method for publishing updated semantic web data to distributed clients. More specifically, conventional semantic web solutions (1) provide query languages and APIs for retrieving specified data patterns from an RDF graph, and (2) provide rudimentary eventing systems allowing clients to receive notification whenever any RDF statements are added or removed to a repository/store. These conventional solutions however, do not efficiently transmit updates to distributed clients, and in particular, do not distribute updates such that clients receive only the information they require or request.

SUMMARY OF THE INVENTION

An object of this invention is to provide a standard method for publishing updated semantic web data to distributed clients.

Another object of the present invention is to leverage existing publish/subscribe technology to distribute updated semantic web data such as RDF, so that clients receive only the information they require.

A farther object of the invention is to provide an architecture for distributing and enforcing semantic web access control information.

Still another object of this invention is to use the same publish/subscribe messaging infrastructure both to distribute updated semantic web data, and also to distribute relevant changes to control information that is used to restrict access to the updated semantic web data.

These and other objectives are attained with a method and system for scalable distribution of semantic web updates. A first embodiment of the invention leverages publish/subscribe technology to distribute those updates such that clients receive only the information they require. A second embodiment of the invention uses an access control feature to limit the statements clients arc allowed to read. Optionally, in this second embodiment, the same publish/subscribe messaging infrastructure may be used both to distribute updated semantic web data, and also to distribute relevant changes to the access control information.

The invention is particularly well suited for use with the Resource Description Framework (RDF) language. In the preferred embodiment of the invention, clients communicate with an RDF store server through a combination of synchronous web service operations, and asynchronous JMS updates, and clients may register for only the updates they are interested in.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
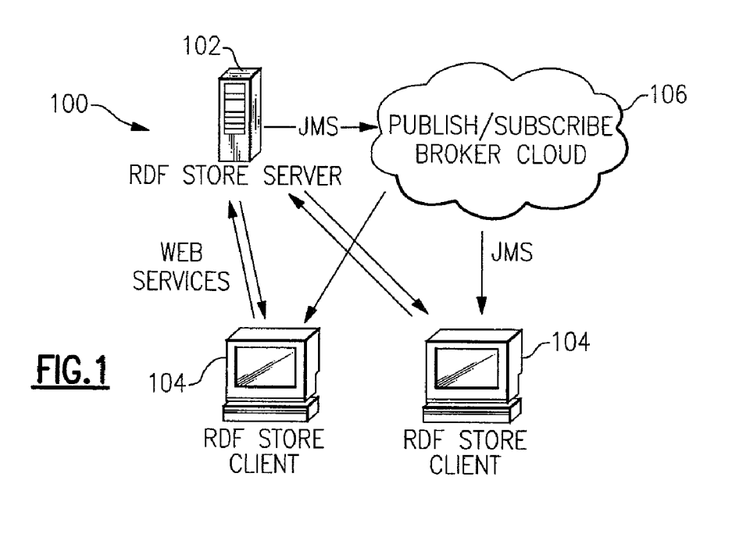
FIG. 1 shows a computer system embodying the present invention.

FIG. 1 illustrates a distributed computer system 100 that may be used in the practice of this invention. In particular, FIG. 1 shows a server computer 102, a plurality of client computers 104, and a publish/subscribe infrastructure 106. The devices of system 100 are connected together by any suitable network. Preferably, this network may be, for example, the Internet, but could also be an intranet a local area network, a wide area network, or other networks.

Any suitable server 102 may be used in system 100, and for example, the server may be an IBM RS/6000 server. Also, the clients 104 of the system may be, for instance, personal computers, laptop computers, servers, workstations, main frame computers, or other devices capable of communicating over the network. Likewise, the devices of system 100 may be connected to the network using a wide range of suitable connectors or links, such as wire, fiber optics or wireless communication links. Distributed system 100 may include additional servers, clients and other devices not shown in FIG. 1.

As mentioned above, in the depicted example, the devices of system 100 may be connected together via the Internet, which is a worldwide collection of networks and gateways that use the TCP/IP suite of protocols to communicate with one another. In the operation of system 100, server 102 provides data and applications to the clients. Among other functions, the server and the clients store semantic web statements such as RDF statements. For this reason, as depicted in FIG. 1, server 102 is referred to as an RDF store server, and clients 104 are referred to as RDF store clients.

Any suitable mechanism may be used to store the RDF statements. For example, relational databases that may be used to store RDF statements are disclosed, in copending application Ser No. 11/348,195, for "Method And System For Controlling Access To Semantic Web Statements," filed Feb. 6, 2006, and copending application Ser. No. 11/348,195, for "Method And System For Efficiently Storing Semantic Web Statements In A Relational Database," filed Feb. 6, 2006, the disclosures of which are hereby incorporated herein in their entireties by reference .

The present invention is directed generally to the distribution of such semantic statements. More specifically, the invention leverages existing JMS publish/subscribe technology (e.g. IBM Websphere Event Broker), represented at 106, to distribute RDF updates such that clients receive only the information they require. Updates include adding, changing or removing RDF statements.

Figure 2:
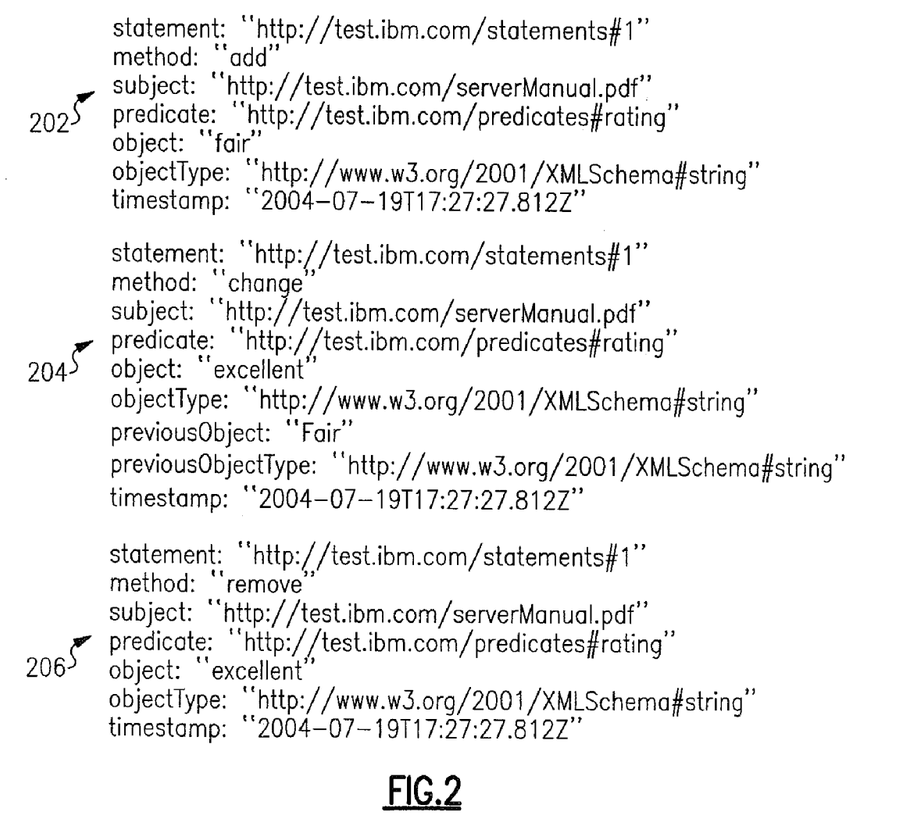
FIG. 2 shows example messages that may be used in the implementation of this invention.

In system 100, clients 104 listen for events using content-based message selection, a feature provided by the JMS standard. The server 102 publishes all events into the publish/subscribe cloud 106, allowing the brokers to discard events that do not match any client subscriptions. The example messages illustrated in FIG. 2 show the properties available for selection by a client. In particular, a message used to add a statement is shown at 202, a message used to change a statement is shown at 204, and a message used to remove a statement is shown at 206. Using the JMS message selector language (similar to SQL), a client may listen for changes affecting particular statements, or statements matching a particular subject/predicate/object pattern. Thus, a client may not be able to receive all events generated by the server 102, but they could efficiently listen for all statements concerning a particular subject resource.

Figure 3:
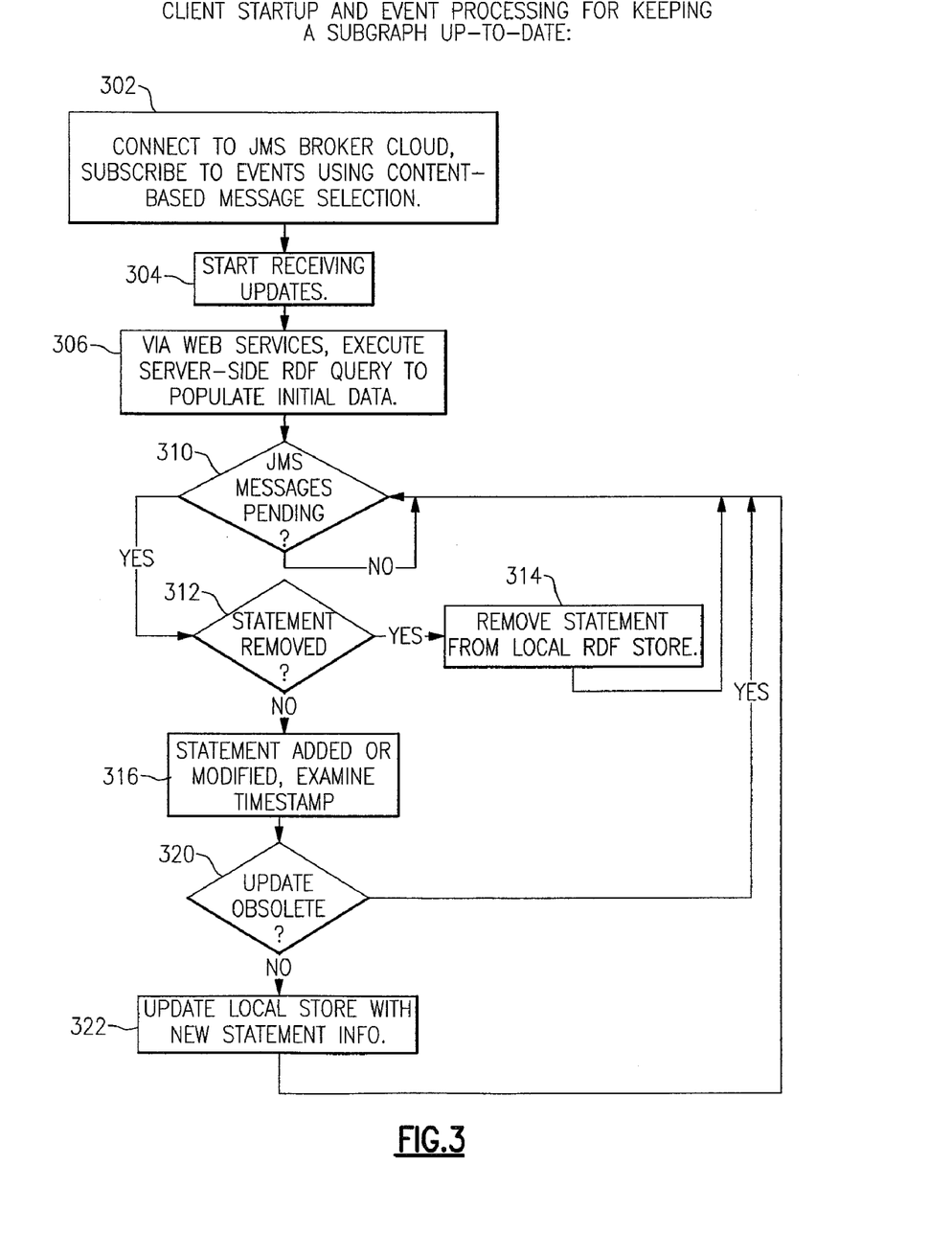
FIG. 3 is a flow chart illustrating the startup and event processing by the clients of the system of FIG. 1.

FIG. 3 illustrates the client startup and event processing for keeping a subgraph up-to-date. In this routine, at step 302, the client 104 connects to the JMS broker cloud 106, and subscribes to events using content-based message selection. At step 304, the client starts to receive updates. At step 306, the client executes a server-side RDF query (e.g. RDQL (RDF Data Query Language) or SPARQL (Simple Protocol And RDF Query Language)), via web services, to populate initial data.

At step 310, the routine checks to determine if any JMS messages are pending. If no messages are pending, this step is repeated until a message is pending; and, when a message is pending, the routine moves on to step 312. At this step, the client checks to determine if the pending message indicates that an RDF statement has been removed. If this is the case, the statement is removed from the local RDF stores at step 314, and the routine returns to step 310.

If, at step 312, the pending message does not indicate that an RDF statement is being removed, then the pending message indicates that a statement is being added or modified, and from step 312, the routine proceeds to step 316. At this step, a time stamp on the message is examined. If, as represented at step 320, the timestamp shows that the update is obsolete, then the routine returns to step 310. If the message is not obsolete, then, at step 322, the local store is updated with the new statement information, and then the routine returns to step 310.

Figure 4:
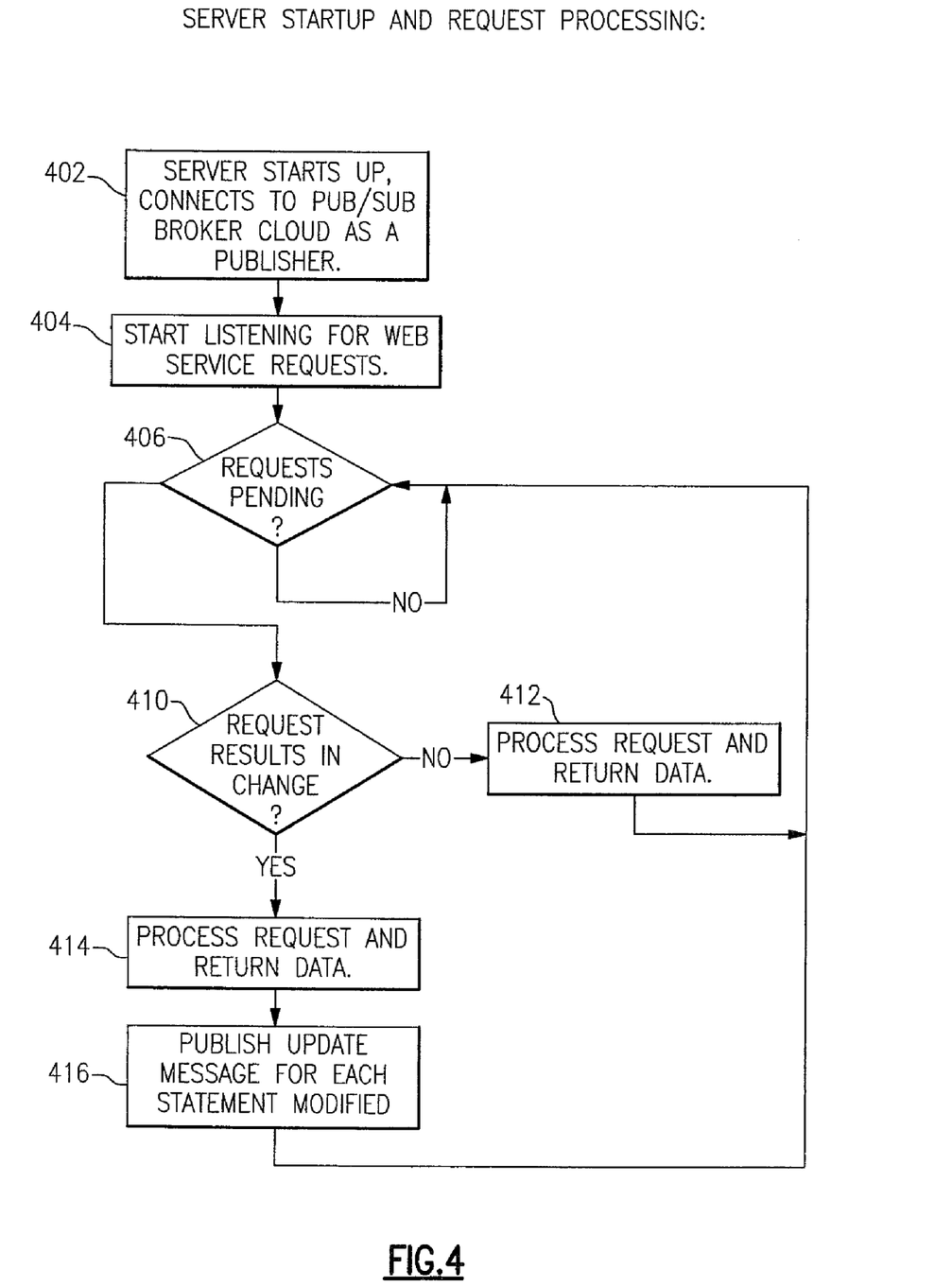
FIG. 4 is a flow chart showing the startup and request processing by the server of FIG. 1.

FIG. 4 shows the server 102 startup and request processing. At step 402, the server starts-up and connects to publish/subscribe broker cloud 106 as a publisher; and at step 404, the server starts to listen for web server requests. At step 406, the server checks to determine if any requests are pending. If none are, the server continues to listen for requests until a request is pending. When this happens, the routine moves on to step 410, where the routine determines whether the request results in any change. If it does not, then, at step 412, the request is processed and data are returned, and then the routine returns to step 406.

However, if at step 410, the request does result in a change, the routine moves on to step 414, and the request is processed and the data are returned. Then, at step 416, an update message is published for each statement modified, and the routine then returns to step 406.

In the operation of system 100, clients communicate with an RDF store server through a combination of synchronous web service operations and asynchronous JMS updates. This operation may be significantly complicated by statement-level access control lists, which restrict which clients are allowed to read which statements. This level of access control means that simple publish/subscribe cannot be relied on alone, because some application-level authentication and message filtering is needed. In addition, RDF statements are added, modified, and removed within the scope of transactions. This also complicates the scenario, since any particular client may only be allowed to see some of the statements involved in a transaction.

Figure 5:
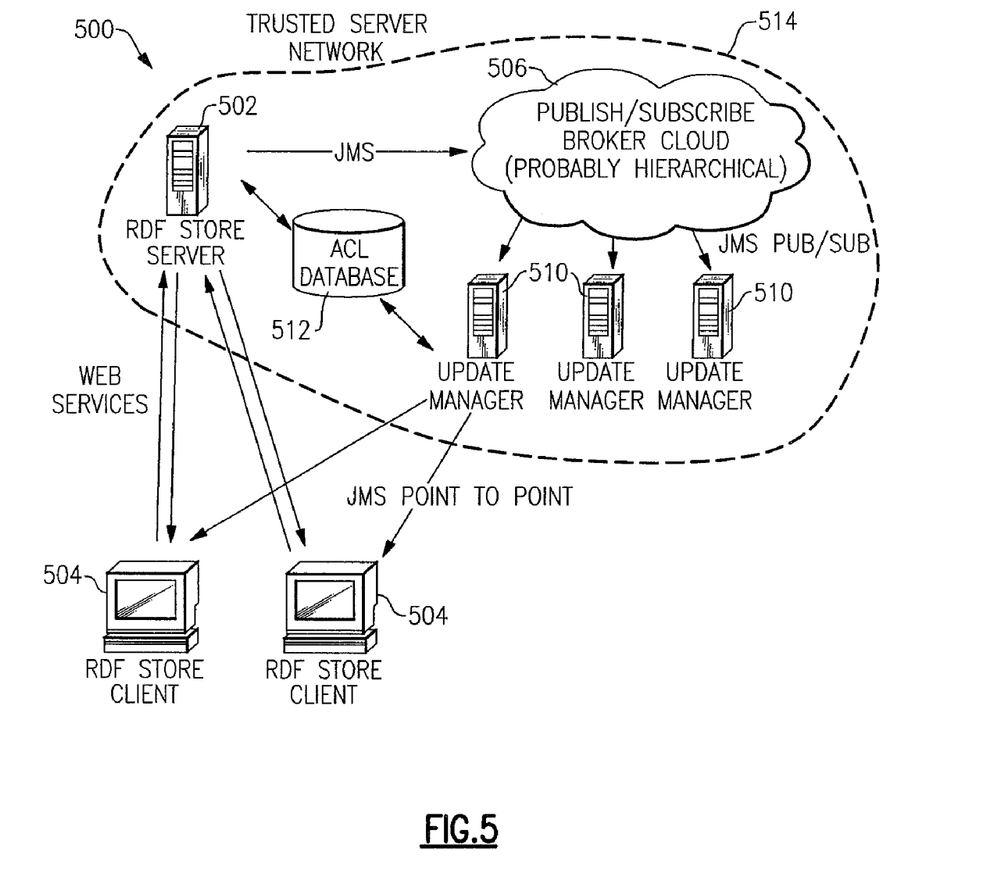
FIG. 5 shows a modification of the system of FIG. 1.

FIG. 5 shows an architecture of a system 500 that accommodates this access control. Similar to system 100, system 500 includes a store server 502, one or more store clients 504, and a publish/subscribe infrastructure 506. System 500 further includes one or more update managers 510 and an ACL database 512. As indicated in the FIG., server 502, publish/subscribe infrastructure 506, update managers 510 and database 512 form a trusted server network 514.

In system 500, clients 504 may connect to one of many update managers (most likely using web services over point-to-point JMS, e.g. IBM WebSphere MQ). After authenticating, the client specifies a pattern for statement updates of interest. These patterns may match the subject, predicate or object of a statement, or other metadata the server chooses to include in the updates such as the date and time the statement is created.

All statement updates are published, one at a time, by the store server, over an internal publish/subscribe broker cloud. The update managers subscribe to statement updates based on the patterns provided by their clients, and listen for all transaction completion messages. Each statement update is tagged with an ACL (Access Control List) identifier. Every time an update manger receives an update, it must ensure that the client is allowed to see the information before passing it on.

Figure 6:
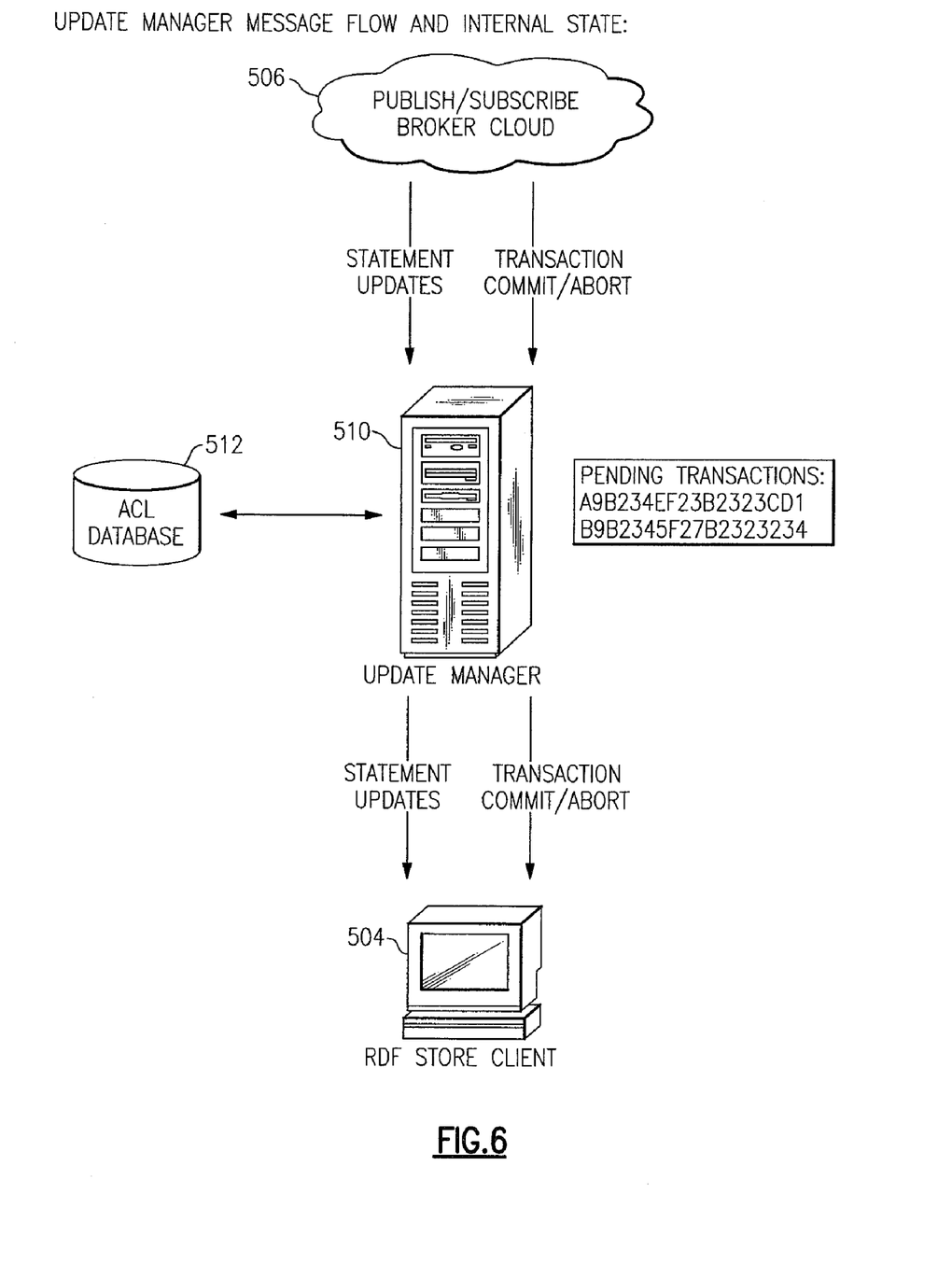
FIG. 6 illustrates the update message flow and internal state of the update managers of the system of FIG. 5.

With reference to FIGS. 5 and 6, in this architecture, the RDF store server shares an ACL database directly with all of the update manager servers. Commonly, it may be noted, ACL data changes much less frequently than statements are updated. Without any additional optimization, each update manager would need to contact the ACL database every time it received a relevant statement update on behalf of a client.

If security policies allow some delay in enforcement after changes to the access control database, HTTP-style caching could be applied here. Update managers would be allowed to cache ACL information, depending on expiration times or get-if-modified operations supported by the ACL database and configured by the store server. It may be noted that with caching, clients connecting to different update managers may see different view of the data (corresponding to different versions of the access control data).

Figure 7:
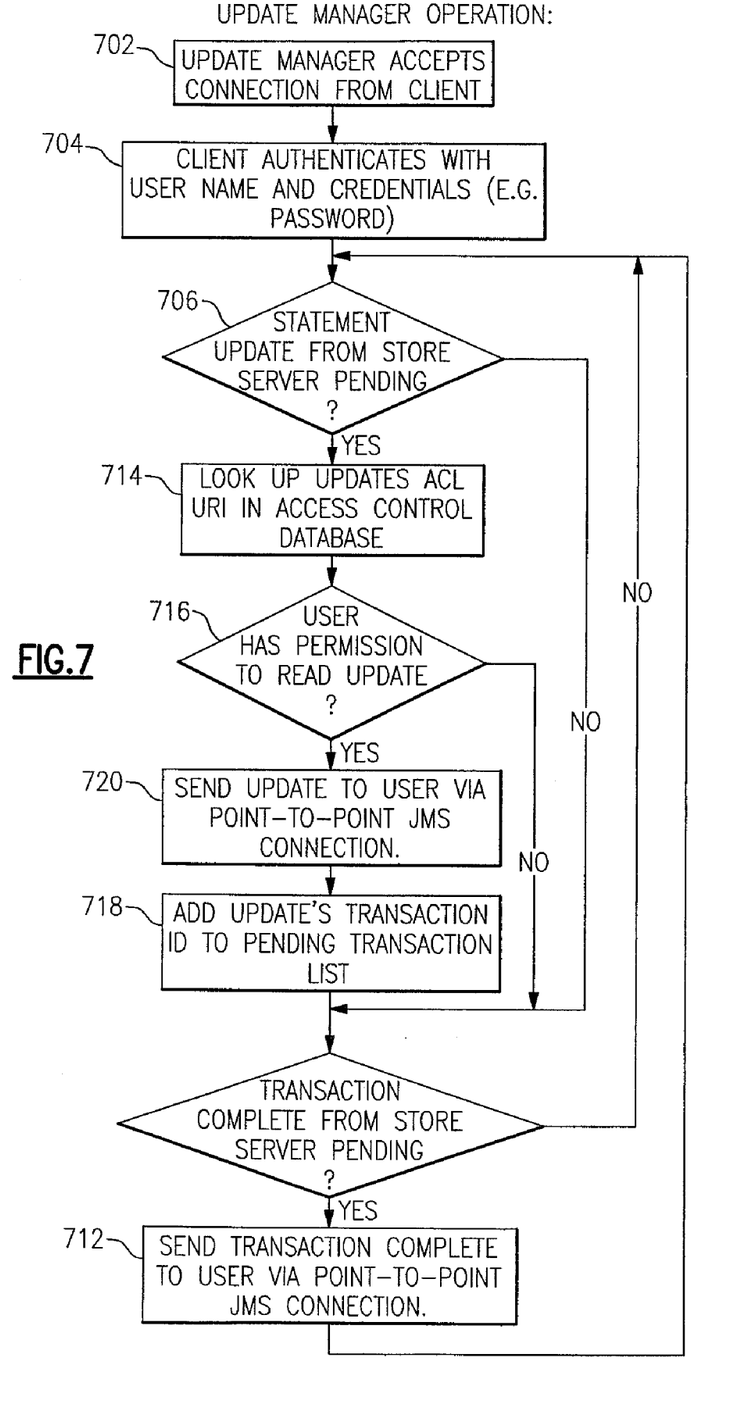
FIG. 7 is a flow chart depicting the operation of the update manager of the system of FIG. 5.

FIG. 7 shows in more detail the operation of the update manager. At step 702, the update manager accepts a connection from a client; and at step 704, client authentication is performed. Then, at step 706, the routine determines whether there is a statement update pending from the store server. If there is not, the routine proceeds to step 710, where the routine determines whether there is a complete transaction pending from the store server. If the transaction is not complete, the routine returns to step 706 and continues on from there. If the transaction is complete, then the routine moves on to step 712, where the completed transaction is sent to the user via a point-to-point JMS connection. After this, the routine returns to step 706 and then proceeds from there.

If, at step 706, there is a statement update pending, then the routine, at step 714, looks up the update ACL URI in access control database, and then, at step 716, determines whether the user has permission to read this update. If the user does have permission, then the routine proceeds to steps 720 and 722. At step 720, the update is sent to the user, via a point-to-point connection; and at step 722, the update transaction ID is added to a list of pending transactions. From step 722, the routine proceeds to step 710. If, at step 714, it is determined that the user does not have permission to read this update, the routine skips to step 710 and proceeds from there.

Figure 8:
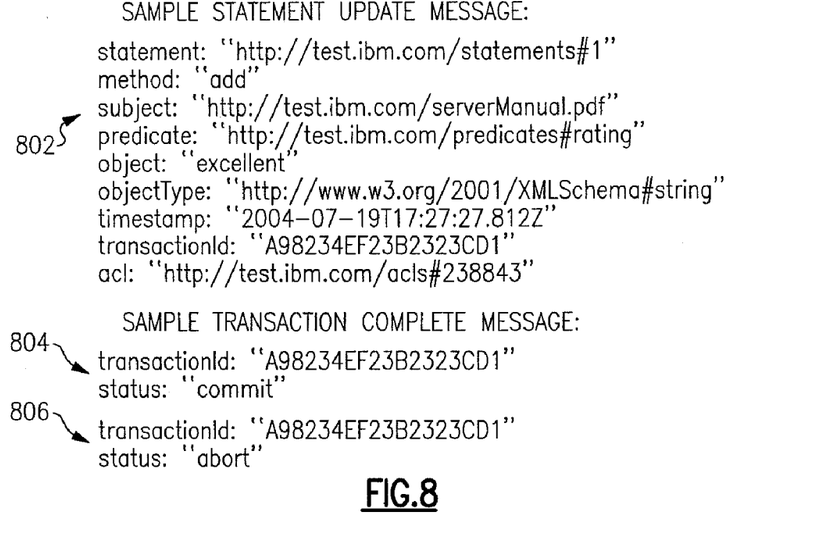
FIG. 8 shows a sample message used in the system of FIG. 5.

FIG. 8 shows sample messages that may be used in the operation of system 500. In particular, a sample statement update message is shown at 802, and sample transaction complete messages are shown at 804 and 806.

Any suitable update managers may be used in the practice of this invention. For example, suitable update managers are described in copending application Ser. No. 11/348,187 for "System And Method For Tracking And Storing Semantic Web Revision History," filed Feb. 6, 2006, and copending application Ser. No. 11/348,194 for "Method And System For Selective Tracking Of Semantic Web Data Using Distributed Update Events," filed Feb. 6, 2006, the disclosure of which is hereby incorporated herein in its entirety by reference.

Figure 9:
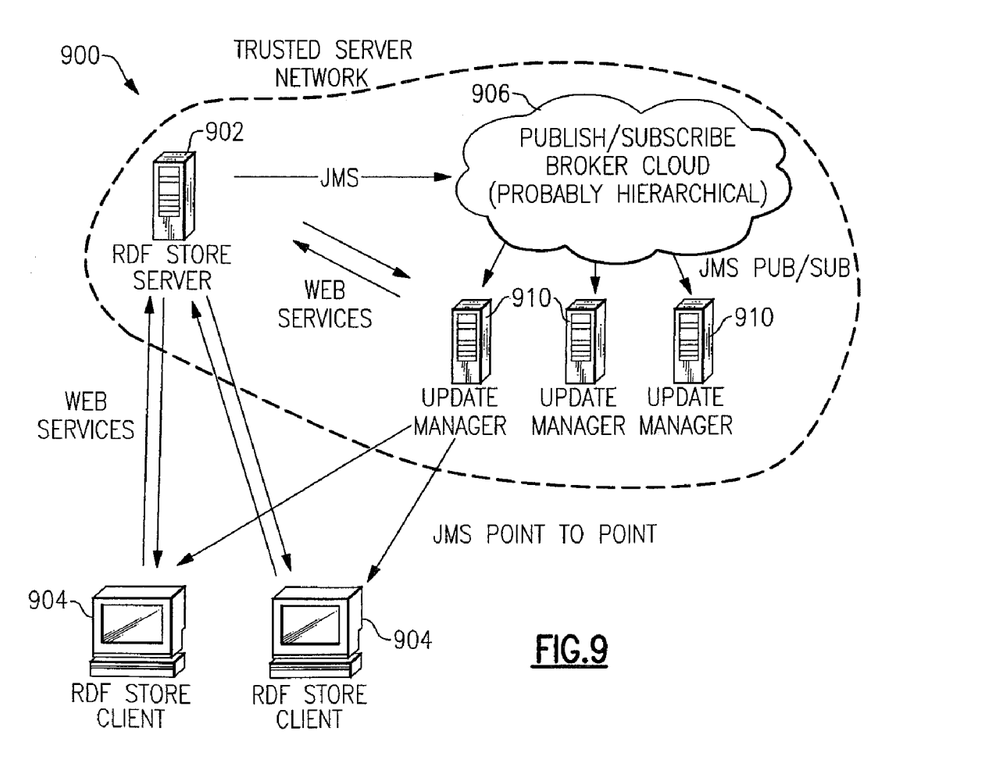
FIG. 9 illustrates an optional modification to the architecture of FIG. 7.

FIG. 9 illustrates another optional feature of the present invention. Specifically, with the system 900 shown in FIG. 9, the same publish/subscribe infrastructure 906 is used both to distribute the updated semantic web data and also to distribute relevant changes to the access control information. In this architecture, modifications to the access control data are applied to the update managers 910, preferably, quickly without sacrificing scalability, and publish/subscribe messaging within the trusted server network is used to distribute relevant ACL information (along with statement updates and transaction completion events) to each update manager.

Figure 10:
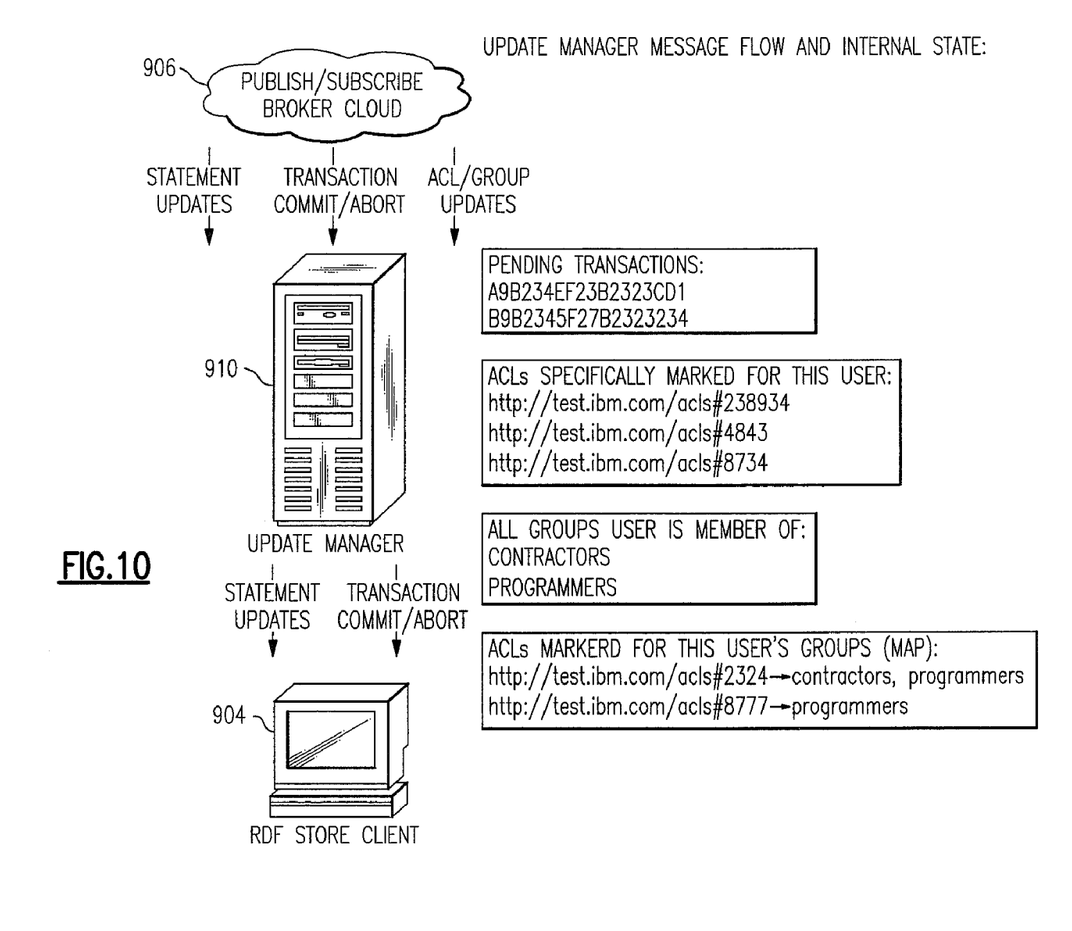
FIG. 10 shows the update message flow and internal state of the update managers of FIG. 9.

With reference to FIGS. 9 and 10, when a user connects to an update manager 910, that server fetches the current list of relevant ACLs and group memberships, then subscribes to changes in that data via publish/subscribe infrastructure 506. By only subscribing to ACL update messages that contain references to the user in question or one of their groups, each update manager avoids receiving extraneous updates. It may be noted that group modifications (relatively infrequent) require an update manager to change its publish/subscribe subscriptions. Because of the asynchronous operation of the publish/subscribe, the update manager may need to request a full snapshot of ACL information from the store server (similar to start-up).

This architecture allows update mangers to filter incoming statement update messages immediately, without contacting any other node.

Figure 11:
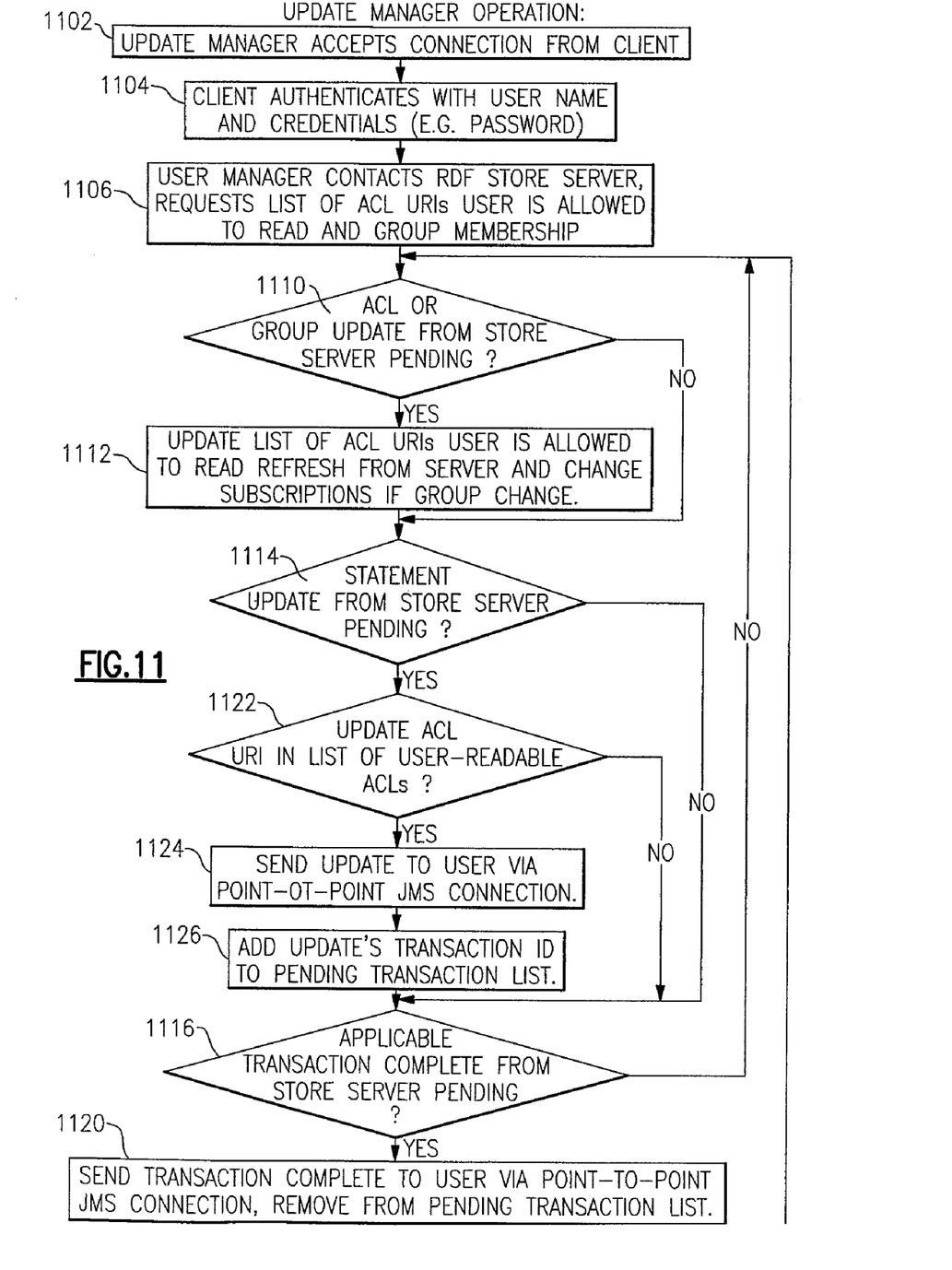
FIG. 11 is a flow chart illustrating the operation of the update managers of the system of FIG. 9.

FIG. 11 shows the operation of the update manager 910 of system 900. As can be seen by comparing FIGS. 7 and 11, the operation of managers 910 of system 900 is similar to the operation of managers 710 of system 700, with some additional steps and some steps modified.

With particular reference to FIG. 11, at step 1102, the update manager accepts a connection from a client; and at step 1104, client authentication is performed. Then at step 1106, the user manager contacts the RDF store server, and requests a list of the ACL UIRs that the user is allowed to read and requests group membership. Then, at step 1110, the routine determines whether there is an ACL or group update from the store server pending. If there is, then at step 1112, the list of ACL UIRs that the user is allowed to read is updated, refresh from server, subscriptions are changed if the user group changes. After step 1112 is completed, the routine proceeds to step 1114. The routine also goes to step 1114 from step 1110 if at this latter step there are no ACL or group updates pending from the store server.

At step 1114, the routine determines whether there is a statement update pending from the store server. If there is not, the routine proceeds to step 1116, where the routine determines whether there is an applicable transaction complete pending from the store server. If there is no such transaction complete pending, the routine returns to step 1110 and continues on from there. If there is such a pending transaction complete at step 1114, the routine moves on to step 1120, where the completed transaction is sent to the user via a point-to-point JMS connection, and this transaction is removed from the pending transaction list. After this, the routine returns to step 1110 and then proceeds from there.

If at step 1114, there is an update statement pending, the routine moves to step 1122, where a determination is made as to whether the user is entitled to this update. If the user is not entitled, the routine proceeds to step 1116; however, if the user is entitled to this update, the routine goes to step 1124. At this step, the update is sent to the user via a point-to-point connection. Then, at step 1126, the update's transaction ID is added to the pending transaction list, and from step 1126, the routine then goes to step 1116 and proceed from there.

Figure 12:
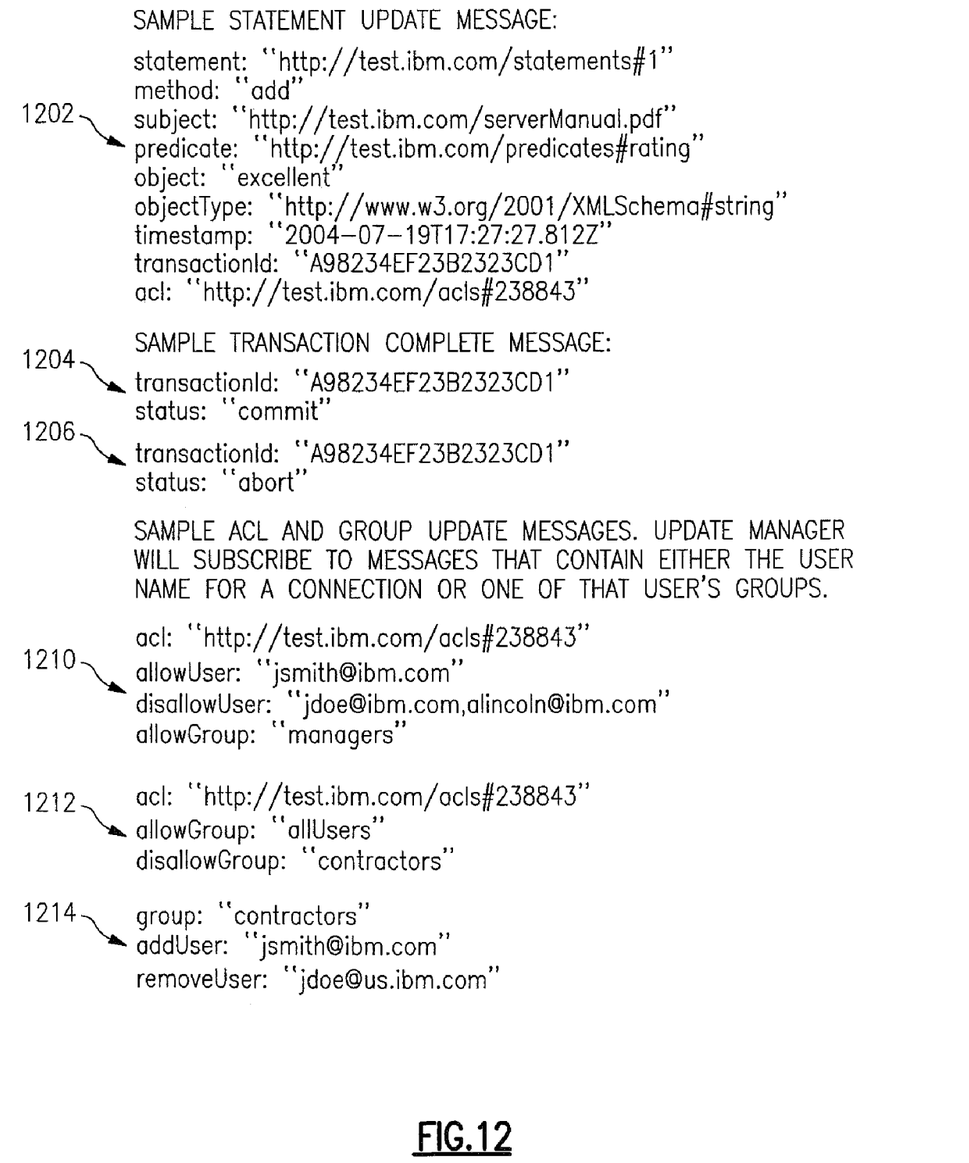
FIG. 12 shows sample messages that may be used in the system of FIG. 9.

FIG. 12 shows sample messages that may be used in the operation of system 900. More specifically, a sample statement update message is shown at 1202, and sample transaction complete messages are shown at 1204 and 1206. Sample ACL and group update messages are illustrated at 1210, 1212 and 1214. Update managers will subscribe to messages that contain either the user name or a connection or one of that user's groups.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of publishing updated semantic web statements to distributed clients, comprising the steps of:
    storing semantic web statements in a server, each of the statements having a subject, a predicate and an object;
    updating said semantic web statements;
    the server publishing a set of updates to said semantic web statements, including the step of the server publishing said updates to a given publish/subscribe infrastructure;
    each of a plurality of distributed clients registering for a respective one subset of said updates, and receiving only updates within said respective one subset, including the step of each of the clients specifying a pattern for the subject, predicate and object of statement updates of interest;
    providing access control lists that identify which ones of the clients are allowed to read which ones of the statements wherein each of the statements is published with a property having an identifier identifying one of the access control lists;
    storing the access control lists in an ACL database; and
    said given publish/subscribe infrastructures distributing to each of the clients only statement updates that match the pattern specified by said each client, and only statements that said each client is permitted, as identified on the access control lists, to read, including the steps of
    i) providing an update manager,
    ii) when each of the statements is published, the update manager finding in the ACL database the access control list identified by the identifier of the property with the published statement, and using said found access control list to determine which ones of the clients are entitled to read the statement.

2. The method according to claim 1, wherein:
    the registering step includes the step of each of said plurality of clients registering with said given publish/subscribe infrastructure to receive the respective one subset of said updates.

3. The method according to claim 2, wherein the distributing step includes the further step of said given publish/subscribe infrastructure distributing to each of said clients only updates for which the client has registered.

4. The method according to claim 3, comprising the further steps of:
    updating the access control lists; and
    the server using the same publish/subscribe infrastructure used to distribute the updates to the semantic web statements, to distribute to the update manager updates to the access control lists.

* * * * *